United States Patent [19]

Oomori et al.

[11] 4,354,195

[45] Oct. 12, 1982

[54] INK JET RECORDING APPARATUS

[75] Inventors: Hideyuki Oomori; Shinji Matsuoka; Mitsuhiro Nakagaki, all of Hitachi, Japan

[73] Assignee: Hitachi, Ltd., Tokyo, Japan

[21] Appl. No.: 214,694

[22] Filed: Dec. 9, 1980

[30] Foreign Application Priority Data

Dec. 11, 1979 [JP] Japan ............................ 54/159743

[51] Int. Cl.$^3$ ............................ G01D 15/18

[52] U.S. Cl. ............................ 346/75

[58] Field of Search ............................ 346/1.1, 75, 140

[56] References Cited

U.S. PATENT DOCUMENTS

| | | | |
|---|---|---|---|
| 3,588,906 | 6/1971 | Van Brimer | 346/75 X |
| 3,688,034 | 8/1972 | Kashio | 346/1.1 X |
| 3,797,022 | 3/1974 | Beam et al. | 346/75 |
| 3,913,719 | 10/1975 | Frey | 346/1.1 X |
| 3,959,797 | 5/1976 | Jensen | 346/1.1 |
| 4,009,332 | 2/1977 | Van Hook | 346/75 X |
| 4,015,267 | 3/1977 | Kasubuchi et al. | 346/1.1 |
| 4,051,485 | 9/1977 | Yamada | 346/75 |

*Primary Examiner*—Donald A. Griffin

*Attorney, Agent, or Firm*—Antonelli, Terry & Wands

[57] ABSTRACT

An ink jet recording apparatus of a dot matrix type in which the amounts of charges given to ink droplets are controlled depending upon recording conditions. The apparatus comprises, in one embodiment, a central processing unit (CPU) capable of generating unit video data and dot data concerning an image to be recorded, a random access memory (RAM) for storing the unit video data, a selector for reading out predetermined number of unit video data among those stored in the RAM, an AND gate receiving the dot data and the selected unit video data and a digital/analog converter for generating from the output of the AND gate an image signal for giving charges to the ink droplets for controlled deflection of them.

7 Claims, 14 Drawing Figures

| SHIFT REGISTER OUTPUT | | | UNIT VIDEO DATA VALUES $V_k$ |
|---|---|---|---|
| QA | QC | QD | |
| 0 | 0 | 0 | $V_{k1} = v_k$ |
| 0 | 0 | 1 | $V_{k2} = v_k + d \cdot v_{k-2}$ |
| 0 | 1 | 0 | $V_{k3} = v_k + c \cdot v_{k-1}$ |
| 0 | 1 | 1 | $V_{k4} = v_k + c \cdot v_{k-1} + d \cdot v_{k-2}$ |
| 1 | 0 | 0 | $V_{k5} = v_k + a \cdot v_{k+1}$ |
| 1 | 0 | 1 | $V_{k6} = v_k + a \cdot v_{k+1} + d \cdot v_{k-2}$ |
| 1 | 1 | 0 | $V_{k7} = v_k + a \cdot v_{k+1} + c \cdot v_{k-1}$ |
| 1 | 1 | 1 | $V_{k8} = v_k + a \cdot v_{k+1} + c \cdot v_{k-1} + d \cdot v_{k-2}$ |

INK JET RECORDING APPARATUS

BACKGROUND OF THE INVENTION

1. Field of the Invention

The present invention relates to an ink jet recording apparatus of a dot matrix type in which amounts of electric charges to be given to ink droplets are controlled for producing an inked image in a dot matrix.

The recording apparatus for recording electrical data inputted through a keyboard or the like input device on a recording medium in a form of an image such as a character, symbol or the like are increasingly and widely employed in various and numerous fields in the present age called the age of information. Under the circumstances, various types of the recording apparatus have been developed. Among all, the so-called ink jet recording apparatus in which ink under pressure is jetted as a train of ink droplets from a nozzle incorporated in a recording head thereby to be deposited on a surface of a recording medium such as paper sheet enjoys many advantages. For example, the recording operation is scarcely accompanied by generation of noise due to a lesser number of movable parts used in the recording head. The images such as those of characters, symbols or the like can be sharply recorded with a high contrast. The recording apparatus exhibits a high-speed response to an input signal. Besides, recording can be made even on profiled or three-dimensional surfaces, not to speak of a flat surface, so far as the ink can adhere to them. In view of these advantages, the ink jet recording apparatus is increasingly employed in many and various industrial fields for recording applications.

2. Description of the Prior Art

When an image such as a character, a symbol or the like is to be written or recorded on a surface of a recording medium other than the commonly used recording paper, e.g. on a surface of an article having a three-dimensional configuration by using the ink jet recording apparatus described above, the distance between the surface on which the recording is to be made and the recording head is subjected to variations owing to the fact that the surface state of the article is often not constant, which may cause the characters and/or symbols are recorded to lack overall uniformity in respect of size and shape. Further, there may arise the case where the size of the character and/or symbol is to be altered when occasion requires.

To cope with these situations, the hitherto known ink jet recording apparatus is usually provided with a variable resistor for adjusting the gain of means for amplifying a video signal which is generated for determining electric charge amount given to ink droplets. The variable resistor is manually adjusted by an operator so as to attain a desired recording in consideration of the state or conditions of the recording surface. Such manual adjustment or manipulation is very troublesome particularly when the conditions or state of the recording surface undergoes frequent variations. Additionally, the manual adjustment requires a high skillfulness, as will be explained later.

In the case of the dot matrix type recording apparatus in which the electric charge amount given to ink droplets is controlled, distortion is likely to be produced in the recorded image due to mutual electrostatic interference among the charged ink droplets which are successively emitted from a nozzle of the recording head toward a recording surface. Such distortion has to be corrected, which however requires various complicated circuits and devices, involving a remarkable increase in the manufacturing cost. A typical one of the distortion correcting means is disclosed in U.S. Pat. No. 3,652,757 to V. E. Bischoff issued on Feb. 9, 1971 entitled "GUARD DROP TECHNIQUE FOR INK JET SYSTEMS".

SUMMARY OF THE INVENTION

An object of the present invention is to provide an ink jet recording apparatus of a simplified structure construction which allows the size of images such as characters, symbols or the like to be adjusted in a much factilitated manner.

Another object of the invention is to provide an ink jet recording apparatus of a simplified construction which is capable of reducing distortions in images such as characters, symbols or the like to a minimum.

In view of the above objects, an ink jet recording apparatus according to an embodiment of the invention comprises at least means for generating a plurality of unit video data associated with charge amount to be imparted to ink droplets for effecting deflection of the ink droplets for recording an image, means for storing the unit video data, means for generating a binary signal utilized for determining whether or not ink droplets be electrically charged in accordance with information of the image to be recorded, and means for selecting a predetermined number of the unit video data among those stored in the storing means. The amount of electric charge to be given to an individual ink droplet is determined on the basis of the binary signal and the selected unit video data.

According to another embodiment of the invention, the ink jet recording apparatus having the above-described structure is further provided with means for sensing information concerning the charge amount given to several ink droplets which are successively emitted, wherein the unit video data to be selected among those stored in the storing means is determined on the basis of the thus sensed information. With such an arrangement, distortion of an image to be recorded can be suppressed to a minimum.

According to still another embodiment of the invention, the ink jet recording apparatus having the above-described structure is further provided with an image size (or height) establishing circuit which is connected to the unit video data generating means. By adjusting the values of the unit video data to be generated, the size of an image to be recorded can be changed.

DESCRIPTION OF THE PREFERRED EMBODIMENTS

Figure 1:
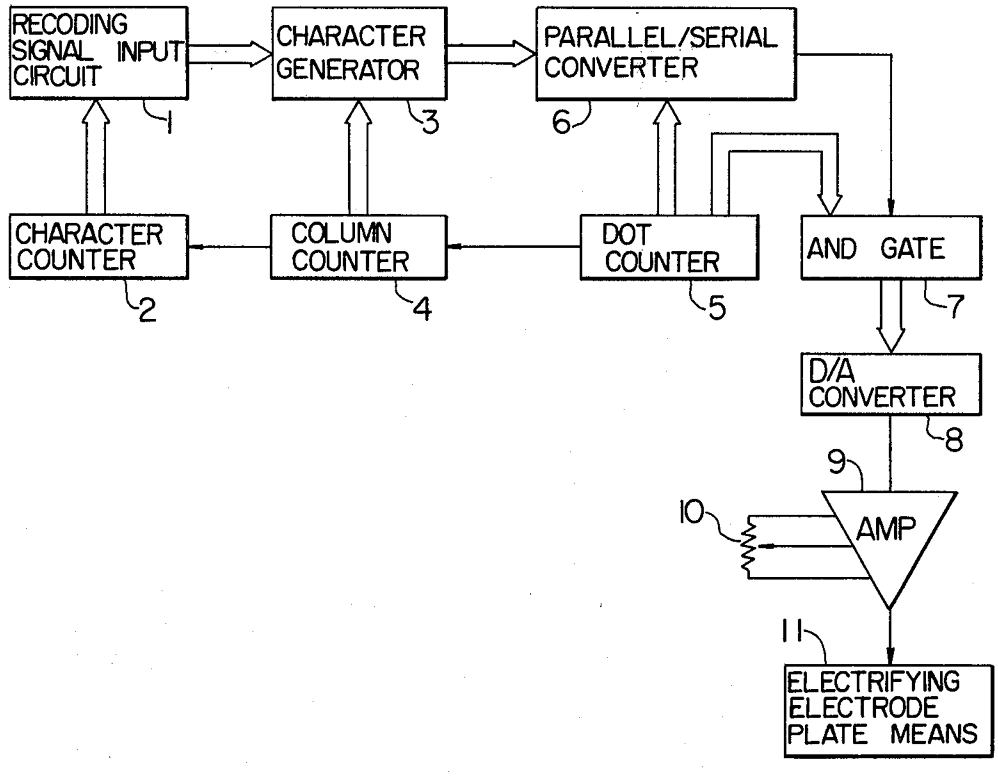
FIG. 1 PRIOR ART
FIG. 1 is a block diagram showing an arrangement of a hitherto known ink jet recording apparatus.

For a better understanding of the invention, description will first be made on a hitherto known ink jet type recording apparatus by referring to FIG. 1.

The recording apparatus as illustrated in this drawing comprises a recording signal input circuit 1 containing recording data (i.e. data to be recorded), a character counter 2 adapted to supply a third clock signal to the recording signal input circuit 1 for reading out therefrom the recording data sequentially on the character-by-character base (or symbol-by-symbol base) with the timing of the third clock signal, a character generator 3 (hereinafter referred to as CG in abridgement) for generating a dot matrix signal indicative of a character, symbol or the like in accordance with the inputted recording data, a column counter 4 for supplying a second clock signal to the CG 3 in order to take out from the latter the dot matrix data in the form of parallel dot data on the column-by-column base, a dot conter 5 for producing a first clock signal defining a timing with which the parallel dot data is read out sequentially on the dot base, a parallel-to-serial converter 6 (hereinafter referred to as P/S converter) for converting the parallel dot data to corresponding serial dot data, an AND gate 7 receiving the outputs of the converter 6 and the counter 5, a digital-to-analog converter 8 (hereinafter referred to as D/A converter) receiving the output of the AND gate 7, an amplifier 9 having a gain adjusting variable resistor 10 and serving to amplify the signal fed from the converter 8, and an electrifying electrode plate means 11 receiving the output signal from the amplifier 9 for imparting electric charge to ink droplets.

When the dot counter 5, the column counter 4 and the character counter 2 are brought into operation in response to a master control clock signal, the recording data are taken out from the recording signal input circuit 1 on the character-by-character base with the timing of the third clock signal produced from the counter 2 and are supplied to the CG 3 to be thereby transformed into dot matrix signals each corresponding to one character or symbol. Each dot matrix signal is derived as plural parallel dot data on the column-by-column base from the CG 3 with the timing determined by the second clock signal produced from the column counter 4 and is supplied to the P/S converter 6 to be converted to corresponding serial dot data, which are then sequentially supplied on the bit-by-bit base to the AND gate 7 which is enabled by the first clock signal available from the dot counter 5. The AND gate 7 is additionally supplied with count data corresponding to the first clock signal from the dot counter 5, thereby to create a logic product of the serial dot data and the count data. The output signal from the AND gate 7 is supplied to the D/A converter 8.

In this connection, it is stated that the count data supplied to the AND gate 7 from the dot counter 5 is incremented each time one bit of the serial dot data is produced from the P/S converter 6. The count data in the dot counter 5 is reset to zero each time when the content of the column counter 4 is incremented and subsequently incremented in the manner described just above. In this way, when all the bits of the dot data produced from the P/S converter 6 and corresponding to one column of the image to be recorded are logic "1", the count data from the dot counter 5 provides a series of video data having staircase waveform information (hereinafter referred to as the reference staircase waveform data) and having a period identical with the period with which the count data in the column counter 4 is varied by one count. On the other hand, when the bits of the bit data taken out from the P/S converter 6 are not all logic "1" but contain bits of logic "0", then there is produced video data carrying such staircase waveform information as having a portion or portions of the reference staircase waveform data dropped to the base level in correspondence to the "0" bits.

The video data thus obtained from the AND gate 7 are converted to a corresponding analog video signal through the D/A converter 8, the analog video signal fed from the D/A converter 8 being subsequently supplied to the amplifier 9 to be amplified to a predetermined level. The amplified video signal is then supplied to the electrifying electrode plate means 11 for giving electric charges selectively to ink droplets, whereby the scanning with jet or train of ink droplets in the column-direction (i.e. heightwise of a character or symbol) as well as the intensity modulation of the ink droplets (i.e. the presence and absence of dots) can be performed with the aid of a conventional deflecting system. Further, by moving the ink jet type recording head and the recording medium relative to each other, the recording medium can be scanned with the train of ink droplets in the lateral direction (i.e. in the row- or line-direction). In this manner, images such as characters and/or symbols or the like each constituted by a dot matrix can be recorded on the recording medium.

In the ink jet recording apparatus described above, the recording head can be implemented with a lesser number of movable parts by virtue of such arrangement that the ink droplets can be directly deflected with the aid of electric signals for the recording. Besides, since excellent response characteristics to electric signals can be attained, it takes lesser time for effecting the recording, which results in that the recording operation can be advantageously carried out at a higher speed. For these reasons, the ink jet recording apparatus is widely employed as the printer for industrial applications such as for direct recording on profiled surfaces of three-dimensional articles, not to speak of paper sheet, as described hereinbefore.

In such direct recording an articles of three-dimensional configurations, the surface of an article on which the recording or printing is to be made will take various and different states or conditions, involving variations in distance between the recording head and the surface of article to be printed and hence possibly variations in size or shape of characters and/or symbol or the like as recorded. Such being the circumstances, measures have to be taken such that the size of character or the like to be recorded can be adjusted in dependence on the article or body to be printed. To this end, the variable resistor 10 is provided for varying the gain of the amplifier 9 to thereby regulate the size of the character or the like to be recorded in a desired manner in the case of the conventional ink jet recording apparatus such as the one shown in FIG. 1.

In this connection, however, it is to be mentioned that variation of the gain of the amplifier 9 will necessarily bring about variations in other characteristics thereof such as the linearity, impedance characteristic or the like, for example, which in turn makes the adjustment of the variable resistor 10 very critical, requiring high skillfulness for manipulation of the variable resistor.

Now, the basic concept of the invention will be described by referring to FIG. 2. The recording apparatus illustrated in this figure is arranged such that a recording surface (i.e. the surface on which characters, symbols or the like are to be recorded or printed) can be scanned with a train of ink droplets jetted from the recording head in two directions which extend substantially orthogonally to each other, e.g. in a first direction corresponding to the column-direction or vertical direction and in a second direction substantially perpendicular to the first direction for recording images such as characters, symbols or the like. The scanning in the lateral or horizontal direction (e.g. row- or line-direction) can be normally effected through relative movement between the recording head and the recording surface. The illustrated recording apparatus according to the invention comprises at least a central control or processing unit 20 (hereinafter referred to as CPU in abridgement) which constitutes means for generating a plurality of unit video data in association with the vertical scanning (i.e. the scanning in the column-direction), a RAM 24 which constitutes means for storing the unit video data, a counter circuit 23 which constitues means for generating a clock signal of a predetermined repetition frequency, the CPU 20, a first-in first-out register 21 and a P/S converter 6 which in combination constitute means for generating a predetermined number of binary signals representative of an image to be recorded in association with the above clock signal, a shift register 25 which constitutes means for selecting sequentially the unit video data stored in the RAM 24 and generating a series of charge amount data containing the staircase waveform information for each of the scannings in the vertical direction, an AND gate 7 which constitutes means for creating a logical product of the clock signal, a predetermined number of the selected unit video data and the binary signal available from the P/S converter 6 through the shift register 25, and a D/A converter 8 which constitutes means for producing an image signal for imparting intended amounts of electric charge to ink droplets. Reference numeral 22 denotes a recording signal input device such as a keyboard, 9 denotes an amplifier for amplifying the output signal from the D/A converter 8 to a desired level, the amplified output signal from the amplifier 9 being supplied to the electrifying electrode plate means 11. The recording head for emitting ink droplets incorporates an electrostrictive device 27 which is supplied with a clock signal of a frequency f through an amplifier 26 for determining the timing with which ink droplets are emitted or jetted. Reference numeral 28 denotes an image size setting or establishing circuit for setting the height or size of characters or symbols to be recorded.

When a main switch (not shown) is turned on for starting of an operation or when the image size in the vertical or column-direction is changed under the command of the image size establishing circuit 28 during operation, a plurality of unit video data are simultaneously written in the RAM 24 from the CPU 20. In this conjunction, it should be noted that the unit video data are in groups, each including i unit video data (i: integer), so that plural groups of the unit video data are stored in the RAM 24. The i unit video data in each of the unit video data groups stored in the RAM 24 constitute a series of charge amount data or a series of staircase waveform data having values varying monotonously and stepwise. These series of charge amount data (staircase waveform data) are associated with one scanning operation in the vertical direction (in the column-direction) and influences the resolution of an image to be recorded in the vertical direction. The number m (m: integer) of charge amount data series generated for the image influences the resolution of the image in the lateral direction (in the row-direction). The height of the each individual stair or step in each of the series of the charge amount data (reference staircase waveform) each constituted by one unit video data group is determined by the signal supplied to the CPU 20 from the image size establishing circuit 28. A plurality of the unit video data groups are required for correction of possible distortion produced in the image to be recorded and for other adjustments. In this manner, it is possible to generate a series of charge amount data containing the staircase waveform information associated with the scanning in the vertical or column-direction for each of the column-scannings by selecting i unit video data among those stored in the RAM 24.

Figure 2:
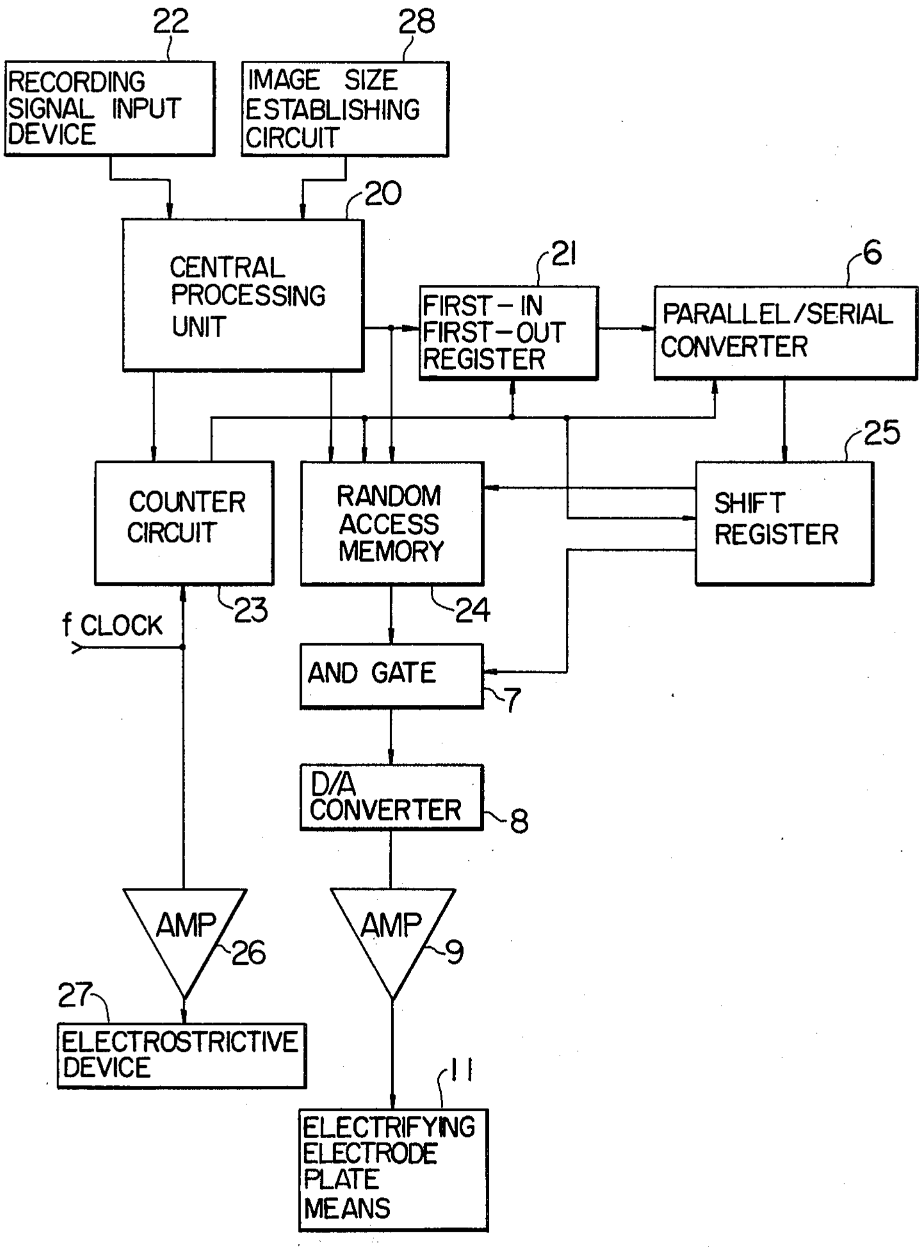
FIG. 2 is a block diagram of an ink jet recording apparatus to illustrate the basic principle of the invention.

Assuming now that a signal for initiating the recording of an image such as a character, symbol or the like is supplied to the CPU 20 from a device which is not shown in FIG. 2 but may be constituted, for example, by a sensor for detecting the presence of an article which is a medium to be recorded, dot matrix record data in the form of a binary signal is produced in parallel m times (m represents an integer) on the column-by-column base and written in the first-in first-out register 21 (hereinafter referred to as FIFOR in abridgement) as dot data. The FIFOR 20 is a kind of a buffer which is arranged so as to allow the dot data to be read out in parallel in the same order as the dot data have been written in but with a timing different from that for the write-in operation under the command of the column or dot clock pulse signal available from the counter circuit 23.

The parallel dot data read out from the FIFOR 21 with the predetermined timing are applied to the P/S converter 6 to be converted to corresponding serial dot data which are then supplied to the shift register 25. As the contents of the individual stages of the shift register 25 are shifted sequentially in response to the column clock pulse signal fed from the counter circuit 23, the serial dot data are supplied to each of the stages of the shift register 25 sequentially by a predetermined number of bits. From a predetermined one of the register stages, a dot data is taken out and supplied to the AND gate 7.

In parallel with the read-out operation from the predetermined stage of the shift register 25, dot data are extracted from a predetermined number of other stages of the shift register 25 and supplied to the address inputs of the RAM 24 to thereby select and read out one by one unit video data stored in the RAM 24 at the associated addresses for every dot data. The unit video data thus read out from the RAM 24 are then supplied to the AND gate 7.

In this manner, there can be produced at the output of the D/A converter 8 a series of charge data or an image signal corresponding to a staircase waveform data including n unit video data (n is an integer). This signal will hereinafter be referred to as the column image signal. The column image signal thus obtained is supplied to the electrifying electrode plate means 11 after having been amplified through the amplifier 9 to a predetermined level, to thereby allow the recording or printing operation to be effected.

The amplifier 26 is adapted to amplify the clock signal of the frequency f for exciting the electrostrictive device 27 incorporated in the recording head to emit the train of ink droplets in synchronism with the clock frequency f. In this connection, the dot clock pulse signal supplied to the shift register 25 is selected to have a frequency equal to f/n where n represents an integer which may be selected from a range of 2 to 15 with a view to reducing the mutual electrostatic interference among the ink droplets.

Figure 3:
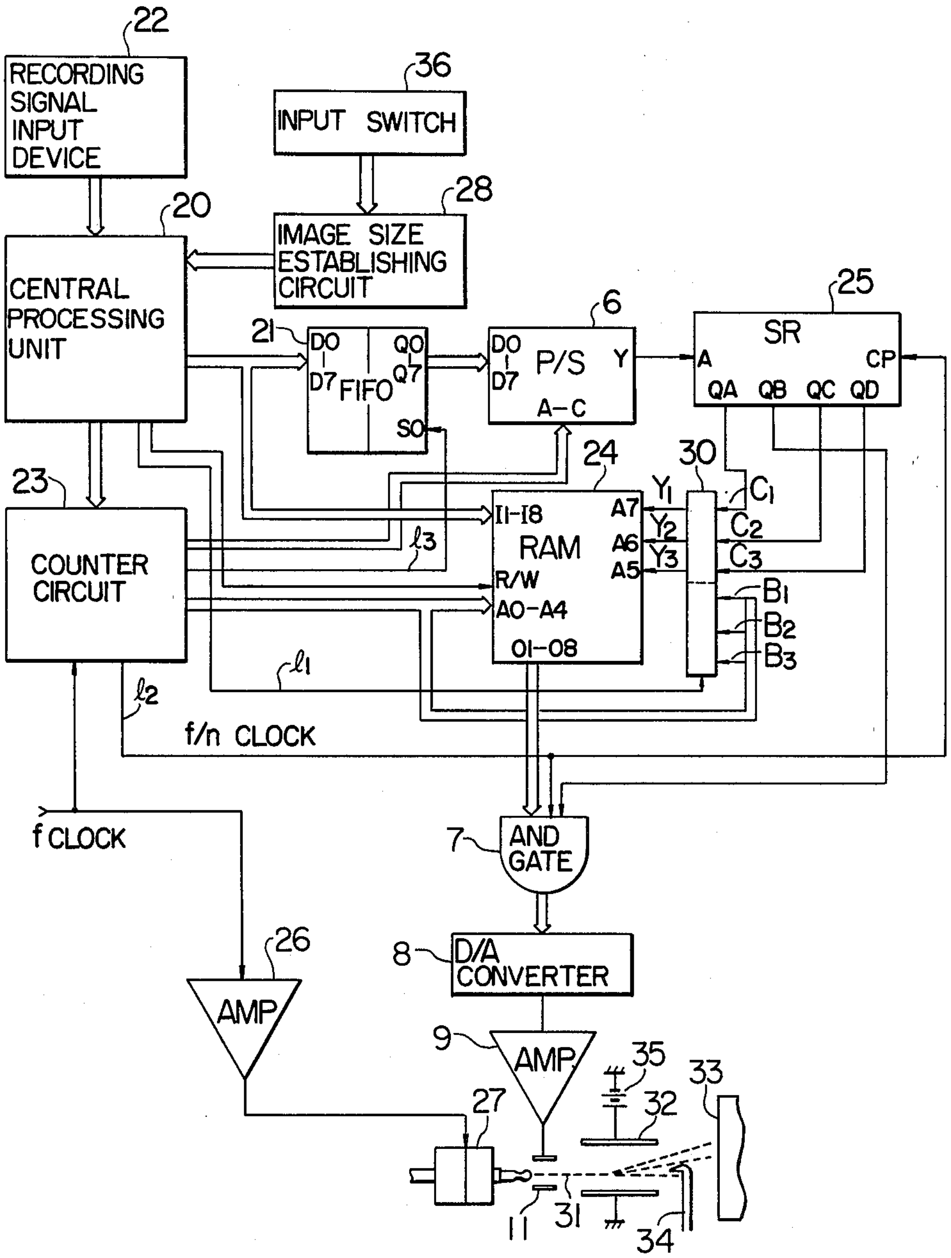
FIG. 3 shows an arrangement of the ink jet recording apparatus according to an embodiment of the invention.

An exemplary embodiment of the invention is illustrated in FIG. 3 in which like reference numerals and/or labels denote like components shown in FIG. 2. Reference numeral 36 denotes an input switch device adapted for producing a signal which allows the size of an image to be changed. The input switch device 36 is connected to the image size establishing circuit 28. Reference numeral 30 denotes a selector circuit having input terminals connected to the outputs of the shift register 25 and the counter circuit 23 and output terminals connected to address input terminals of the RAM 24. Reference numeral 32 denotes deflecting electrode plate means which is supplied with a deflecting voltage from a source 35 and adapted for deflecting ink droplets which are jetted from the electrostrictive device 27 and electrically charged by the electrifying electrode plate means 11 in dependence on the image signal fed from the amplifier 9. Reference numeral 34 denotes a gutter for collecting ink droplets which are excluded from those contributing to the recording of an image on a recording surface 33 under the control of the deflecting electrode array 32, i.e. those ink droplets which are not charged by the electrifying electrode plate means 11 and thus have not undergone deflecting action of the deflecting electrode array 32. The remaining circuit arrangement may be implemented in the manner similar to the one shown in FIG. 1 or 2.

Upon initiation of operation or application of a signal from the input switch device 36 which commands a change or alteration in the size or height of a character (i.e. the size or dimension of a character in the column-direction), a plurality of groups of the unit video data, e.g., eight groups of unit video data are written by the CPU 20 in the RAM 24. In other words, R/W terminal of the RAM 24 is changed over by the CPU 20 to the write-in mode, whereby the input terminals I1 to I8 of the RAM 24 are supplied with unit video data described hereinbefore in conjunction with FIG. 2 in the form of unit video data groups (bytes). At the same time, the CPU 20 supplies a command to the selector circuit 30 through a signal line $l_1$, so that among the two sets of input terminals, i.e. the first set of input terminals C1, C2 and C3 connected to the output terminals QA, QC and QD of the shift register 25 and the second set of input terminals B1, B2 and B3 connected to some of the output terminals of the counter circuit 23 (the three bit output terminals in the case of the illustrated embodiment), the input terminals B1 to B3 of the second set are validated to be electrically associated with the output terminals Y1 to Y3. As a result, the five bits of those of the address signal (composed of eight bits in the case of the illustrated embodiment) issued from the counter circuit 23 are supplied to the input terminals A0 to A4 of the RAM 24, while the remaining three bits are supplied to the input terminals A5 to A7 of the RAM 24 by way of the selector circuit 30. Accordingly, a number of unit video data groups (eight groups, for example) are written in the RAM 24 at the addresses designated by the address information supplied to the input terminal A0 to A7 of the RAM 24 from the counter circuit 23. Operation for writing the unit video data groups will be descrived hereinafter in conjunction with FIG. 7.

In response to issuance of the instruction commanding the recording operation of an image such as a character, symbol or the like, the R/W terminal of the RAM 24 is controlled to be in the read-out mode by the CPU 20, so that a command signal is applied to the selector circuit 30 through the signal line $l_1$ for enabling the first set of the input terminals C1 to C3 to be electrically associated with the output terminals Y1 to Y3 of the selector circuit 30. Further, parallel dot data in the form of a binary signal is written by the CPU 20 in the FIFOR 21 through the input terminals D0 to D7 by byte on the column-by-column base and makes appearance at the output terminals Q0 to Q7 to be applied to the input terminals D0 to D7 of the P/S converter 6.

Since the P/S converter 6 is supplied with a select signal of three bits through the terminals A to C in synchronism with the dot clock pulse signal of the frequency f/n produced on a signal line $l_2$ from the counter circuit 23, the parallel dot data at the input terminals D0 to D7 of the P/S converter 6 are taken out at the terminal Y in the form of serial dot data in synchronism with the dot clock pulse signal and applied to the input terminal A of the shift register 25.

In this conjunction, the phrase "dot clock pulse signal" is intended to mean a clock pulse signal having a repetition frequency of f/n (i.e. the repetition frequency equal to a quotient resulted from division of the clock signal of the frequency f by the number n) and a pulse width equal to a period of the original clock pulse signal f. If the pulse width is larger, excess ink droplets will be electrically charged, while if the pulse width is smaller, the amount of charges given to ink droplets will be insufficient. As an example, the frequency f may be 60 KHz with n being equal to 3 or 4.

When one byte of data appearing at the output terminals Q0 to Q7 of the FIFOR 21 has been transferred to the P/S converter 6, a shift pulse is applied to the terminal SO (shift-out terminal) of the FIFOR 21 from the counter circuit 23 through a signal line $l_3$, so that the data appearing at the terminals Q0 to Q7 of the FIFOR 21 are updated to the next data for one column.

On the other hand, the serial dot data input to the terminal A of the shift register 25 are sequentially shifted through the register stage outputs QA, QB, QC and QD in this order in response to the dot clock pulse signal of the frequency f/n. One of these outputs of the shift register 25, say, the output QB is used as the data for dots to be currently recorded and is supplied to the AND gate 7.

Since the AND gate 7 is further supplied with one unit video data from the RAM 24 as selected by the selector circuit 30 for every dot and the dot clock pulse signal of the frequency f/n, the output signal from the AND gate 7 applied to the D/A converter 8 will give rise to generation of an image signal at the output terminal of the D/A converter in synchronism with the dot clock pulse signal of the frequency f/n. The image signal thus produced is supplied to the electrifying electrode plate means 11 after having been amplified through the amplifier 9. The selecting operation of the selector circuit 30 will be described hereinafter.

Meanwhile, since the electrostrictive device 27 incorporated in the recording head is excited by the clock pulse signal of the frequency f having been amplified through the amplifier 26, the ink droplets 31 are flying through the space defined between the electrifying electrode plate means 11 in synchronism with the clock pulse signal f. Among the ink droplets, only those which are flying or running in synchronism with the dot clock pulse signal of the frequency f/n are imparted with electric charges and undergo deflecting action exerted by the deflecting electrode array 32 in accordance on the image signal, and deposited on the recording surface 33 at predetermined locations to produce a record. The droplets which have not been imparted with the electric charge will be moved straightly without being subjected to the deflecting action of the deflecting electrode array 32 to be trapped and collected by the gutter 34 for recovery.

In the apparatus shown in FIGS. 2 and 3, the RAM 24 is provided in such arrangement that a plurality of the reference staircase waveforms (i.e. a plurality of the unit video data groups) each containing i unit video data can be written therein. By virtue of such an arrangement, the recording operation can be effected accurately by correspondingly accommodating variations of the recording conditions such as change in the property of ink, variation in the aperture of nozzle orifice of the recording head, variation in the effective voltage and so forth through corresponding adjustment of the values of the unit video data to be written in the RAM 24. Further, the height or vertical dimension of a character to be recorded can be varied in a facilitated manner, not to speak of correction of distortions.

In more detail, referring again to FIG. 3, the write-in operation of a plurality of the unit video data groups in the RAM 24 from CPU 20 is performed at the initiation of operation due to turn-on of the power switch, as described hereinbefore. At that time, data are supplied to the CPU 20 from the image size establishing circuit 28, which data command that the value (height) of individual stairs or steps of the reference staircase waveform data represented by the i unit video data should correspond to the height designated by the input switch device 36. The command data can be altered in an arbitrary manner by means of the input switch device 36, as described hereinbefore.

Figure 4A:
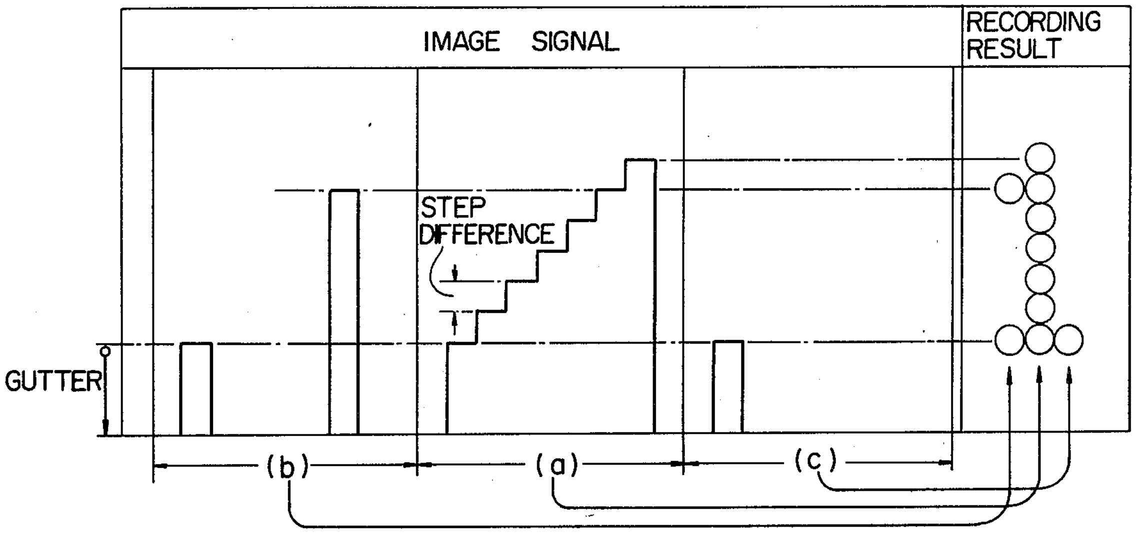
FIGS. 4A and 4B are diagrams to illustrate graphically operation of the apparatus according to an embodiment of the invention.

It is now assumed that the unit video data which cause the image signal for a single column (i.e. the column image signal) to be produced at the output of the D/A converter 8 on the basis of a single reference staircase waveform data such as one illustrated in FIG. 4A at (a) is written in the RAM 24. In this connection, it should be mentioned that although a predetermined number of video data groups (e.g. eight groups) are stored in the RAM 24 as described hereinbefore, the following description will concern only the one standard or reference unit video data group.

Assuming, by way of example, that the image to be recorded corresponds to a numeral "1", the column image signals for three columns for producing the image of the numeral "1" will be of such forms as shown in FIG. 4A at (b), (a) and (c), respectively. It is further assumed that the step difference of the column image signal (a) based on the reference staircase data is unity. Under the conditions, when the height of the character (i.e. the numeral "1") is to be doubled through corresponding manipulation of the input switch device 36, the image size establishing circuit 28 issues alteration data to the CPU 20, whereby the plurality of unit video data groups stored in the RAM 24 are replaced by such unit video data which give rise to the appearance of the column image signal based on the reference staircase waveform data illustrated in FIG. 4B at (a') at the output terminal of the D/A converter 8. At that time, the step difference of the staircase waveform signal (a') is two on the above assumption that the step difference of the signal shown at (a) in FIG. 4A is unity.

Figure 4B:
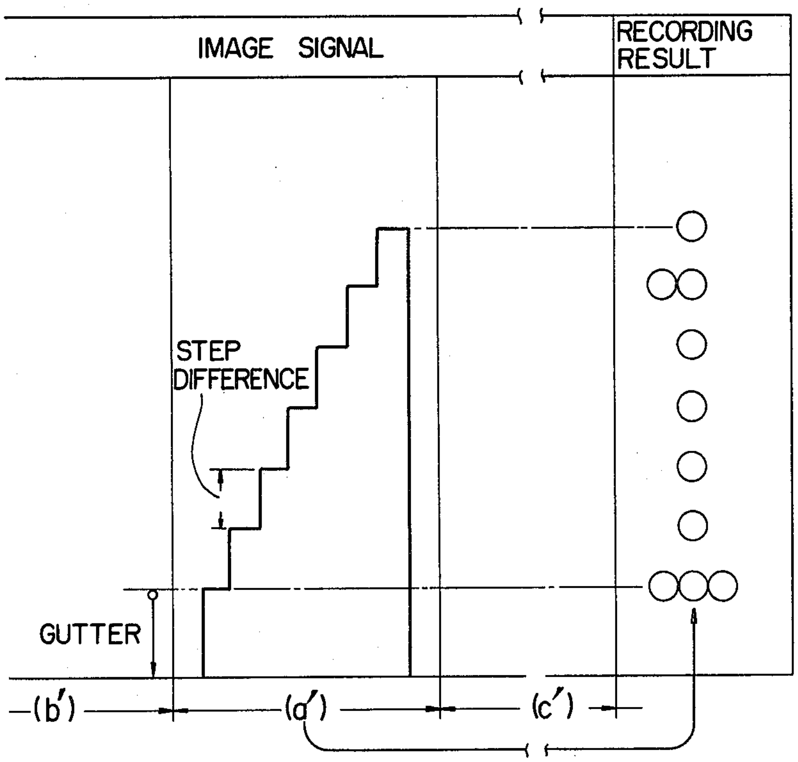

In this manner, by deriving the column image signal (a') from the reference or standard staircase waveform data for recording the image, say, the numeral "1", there is produced a recorded image, shown in FIG. 4B which is twice as tall as the corresponding image shown in FIG. 4A.

It will now be understood that in the case of the illustrated embodiment, the height or vertical dimension of a character or symbol or the like to be recorded can be adjusted in an arbitrary manner merely through manipulation of the input switch device 36. In other words, the height of a character, symbol or the like to be recorded can be varied in correspondence to variations in the recording surface or different surface conditions in a much simplified manner with an improved reliability without exerting any influences to other operating conditions. As described hereinbefore, a plurality of unit video data are written in the RAM 24 for the CPU 20, wherein one of these unit video data is selected for every pulse of the dot clock pulse signal having the frequency f/n and supplied to the AND gate 7.

Next, operation for selectively extracting one of the plural unit video data will be described by referring to FIG. 3. Except for the output signal QB produced from the associated stage of the shift register 25 which is supplied to the AND gate 7 for use in constituting an image signal, the output signals QA, QC and QD produced from the respective stages of the shift register 25 are applied to the input terminals A1, A2 and A3 of the selector circuit 30. During the image recording operation, i.e. except for a time interval during which the write-in operation of the unit video data groups in the RAM 24 from the CPU 20 or replacement of the unit video data groups stored in the RAM 24 is being performed, the input terminals C1, C2 and C3 of the selector circuit 30 are electrically so associated with the output terminals Y1, Y2 and Y3 that the address input terminals A5, A6 and A7 of the RAM 24 are supplied with an addressing signal designating the address of the unit video data to be selected in response to the bit data which make appearance at the outputs QA, QC and QD of the shift register 25 for every pulse of the dot clock pulse signal having the repetition frequency f/n. This addressing signal carries information designating which one of the eight unit video data groups be selected. On the other hand, an addressing signal is also applied to the address input terminals A0, . . . , A4 of the RAM 24 from the couner circuit 23 for designating the address of a unit video data to be selected. The addressing signal mentioned secondly contains information on the position of the charge amount data for a dot under consideration in the series of the charge amount data (corresponding to one column-scanning) which contains the staircase waveform information composed of i unit video data (i represents an interger). As a consequence, the unit video data stored at the designated address is selected for every pulse of the dot clock pulse signal of the frequency f/n and transferred from the RAM 24 to the AND gate 7 to be utilized for producing an image signal.

Figure 5:
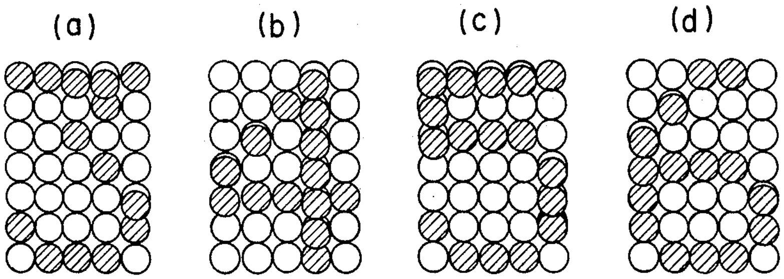
FIG. 5 graphically shows distortions of images recorded by a hitherto known ink jet recording apparatus.

By the way, in the case of the dot matrix type recording apparatus in which the charge amount for the ink droplets is controlled, there may be produced image distortions due to electrostatic interferences among the charged ink droplets and others. FIG. 5 is to illustrate the manners in which distortions appear in recorded images.

FIG. 5 shows results of the recordings performed by the ink jet recording apparatus adapted for producing a recorded image in a dot matrix including five columns and seven rows. In this figure, hatched and blank circles represent the positions at which the ink droplets are actually and ideally deposited, respectively. It will be seen from misalignments between the hatched circles and blank circles that some of the inked dots are deviated from the proper dot positions at which the ink droplets are required to be deposited. Such deviation of the inked dots from the normal or required positions can be explained by the fact that the ink droplet which gives rise to the positional deviation upon deposition on the recording surface is preceded and followed by the charged ink droplets, respectively, as far as the electrostatic interference is concerned.

More specifically, referring to the dot matrix shown at (a) in FIG. 5, an inked dot located at an intersection between a third column (as counted from the left to the right) and a seventh row (as counted upwardly from the bottom) as well as those positioned at intersections between a fourth column and sixth and seventh rows, and a fifth column and second and third rows, respectively are remarkably deviated from the respective normal positions. In the case of an image produced in the dot matrix illustrated at (b) in FIG. 5, those inked dots located at intersections between the first column and the fourth row, and the fourth column and the second to seventh rows, respectively, are deviated from the respective proper positions. In the case of an image illustrated at (c), the inked dots positioned at intersections between the first column and the fifth and sixth rows, the second to fourth columns and the seventh row, and the fifth column and the second and third rows, respectively, are deviated from the respective normal positions. Finally, in the case of a recorded image illustrated at (d), positional deviation is found at the inked dots located at intersections between the first column and the fifth row, the second column and the sixth row, and the fifth column and the third row, respectively.

In conjunction with the problem mentioned above, reference is once again made to FIG. 3. It will be appreciated that the output signals QA, QC and QD of the shift register 25 constitute parts of a binary signal representative of an image signal to be recorded and represent the output bit signals applied or to be applied to the ink droplets at bit positions (less significant and more significant bit positions) preceding to and following, respectively, the output bit signal QB which takes part in forming an image signal to be given to the ink droplets 31 through the electrifying electrode plate means 11 in correspondence to a given pulse of the dot clock pulse signal having the repetition frequency of f/n.

Figures 6, 7:
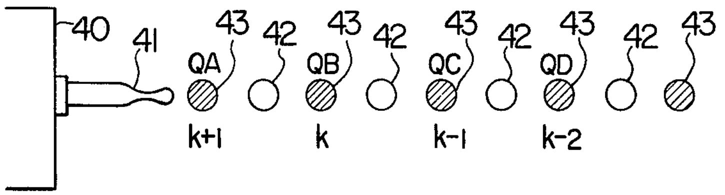
FIG. 6 pictorially illustrates flying ink droplets jetted from a recording head.
FIG. 7 shows in a list the values of data required for correcting image distortions according to an embodiment of the invention.

More specifically, reference is to be made to FIG. 6. In this figure, reference numeral 40 denotes a recording head, 41 denotes an ink column jetted from the recording head 40, and 42 and 43 denote flying ink droplets which are formed by means of the electrostrictive device 27 (FIG. 3) of the recording head 40 in synchronism with the clock pulse signal of the frequency f. The ink droplets 42 are not electrically charged because the time points at which these ink droplets are emitted out of phase of the dot clock pulse signal of the frequency f/n. Consequently, these ink droplets 42 are collected by the gutter 34 (FIG. 3) without being utilized for the image formation. It will be seen that the value of n is selected equal to 2 (two) for producing the ink jet illustrated in FIG. 6.

For the convenience of description, the ink droplets 43 which are emitted in phase with the pulses of the dot clock pulse signal having the frequency of f/2 and which are used for the recording are identified by numbers (k+1), k, (k−1) and (k−2), respectively. Assuming that the k-th ink droplet 43 has been emitted so that it is instantly at the position to be imparted with electric charge by means of the electrifying electrode plate means 11 (FIG. 3), the electric charge given to the k-th ink droplet 43 corresponds to the bit output QB of the shift register 25 (FIG. 3), while the electric charge which will be given to the (k+1)-th ink droplet 43 corresponds to the bit output QA of the register 25. Further, the charges given to the (k−1)-th and (k−2)-th ink droplets 43 correspond to the bit outputs QC and QD, respectively, of the shift register 25.

In this way, the charged states of the ink droplets such as (k+1)-th, (k−1)-th and (k−2)-th droplets (i.e. whether or not these ink droplets have been or will be electrically charged) preceding to and following, respectively, the k-th droplet which is just going to be imparted with the electric charge at a given time point in accordance with the image signal can be determined by sensing the states of the bit outputs QA, QC and QD of the shift register 25.

On the basis of combinations of the (k+1)-th, (k−1)-th and (k−2)-th ink droplets which are electrically charged or uncharged, eight patterns of the charge states are conceivable, whereby distortion which the k-th ink droplet will suffer due to the electrostatic mutual interference can be estimated on the basis of these charge patterns. Of course, such estimation or prediction is not definite but of approximation. Correction of distortion can be effected satisfactorily starting from the experimentally ascertained fact that substantially all the electrostatical influences exerted to a flying or running ink droplet in concern are practically ascribable to the electric charges carried by the two ink droplets immediately preceding to the concerned droplet and the charge of a single ink droplet which immediately follows the latter. More particularly, the recording distortion is caused by electrostatic interference between charged ink droplets, as has been described above. The electrostatic interference includes (i) electrostatic repulsion between flying charged ink droplets and (ii) electrostatic influence of charged ink droplets flying in advance on a droplet being charged by the electrifying electrode plate means. Another cause for the recording distortion may be (iii) the air resistance which an ink droplet suffers during flying. Cause (ii) is most influenced by the right preceding charged ink droplet. However, the degree of influence becomes fairly small as the distances between the ink droplet being charged and the preceding charged ink droplets are larger. Thus, practically, consideration of $v_{k-1}$ and $v_{k-2}$ is sufficient. As for Causes (i) and (iii), the succeeding charged ink droplets as well as the preceding charged ink droplets influence them. By taking up $v_{k+1}$, $v_{k-1}$ and $v_{k-2}$, the above-mentioned causes are almost successfully suppressed. If only suppression of electrostatic repulsion is intended, consideration of $v_{k+1}$ and $v_{k-1}$ will be sufficient.

Referring again to FIG. 3, the number of the unit video data groups written in the RAM 24 from the CPU 20 is assumed to be equal to 8 (eight). The eight groups of the unit video data contain reference staircase waveform data which differ from one another in dependence on the states of the bit outputs QA, QC and QD of the shift register 25 in such a manner as shown in FIG. 7. More particularly, value $V_k$ of the i unit video data constituting one unit video data group is determined on the basis of one of the eight types of values $V_{k1}$ to $V_{k8}$ listed in FIG. 7 in dependence on the binary states of the bit outputs QA, QC and QD of the shift register 25. For write-in operation of these unit video data groups, the second set of the input terminals B1, B2 and B3 of the selector circuit 30 are validated by the CPU 20, as described hereinbefore. The addressing signals applied to the address input terminals A5, A6 and A7 of the RAM 24 are supplied from the counter circuit 23 in such a manner that the binary states of the bit outputs QA, QC and QD from the shift register 25 and hence the binary states of the first set of input terminals C1, C2 and C3 correspond to the binary states of the second set of input terminals B1, B2 and B3. Further, the counter circuit 23 supplies the addressing signals to the other address input terminals A0 to A4 of the RAM 24. As a consequence, the eight unit video data groups are written in the RAM 24 at the addresses designated by the addressing signals applied to the input terminals A0 to A7. In other words, when the addressing signals supplied from the counter circuit 23 to the address input terminals A5, A6 and A7 of the RAM 24 through the input terminals B1, B2 and B3 of the selector circuit 30 coincide with the bit outputs QA, QC and QD of the shift register as illustrated in FIG. 7, the corresponding unit video data values are given and written in the RAM 24.

It should here be mentioned that the bit outputs QA, QC and QD of the shift register 25 take logical state "1" when the electric charge to be imparted to the ink droplets is present, while taking logical level "0" when no charge is to be given to the ink droplets. Concerning the value $V_k$ of the unit video data (charge amount value), $v_k$, $v_{k+1}$, $v_{k-1}$ and $v_{k-2}$ shown in FIG. 7 represent the values of data corresponding to charge amount to be given as the unit video data when no correction is made, and a, c, d represent proportional constants (all smaller than 1 inclusive thereof). These constants should be experimentally determined. They may be, for example, $a=2/128$, $k=5/128$ and $d=1/64$.

Referring once again to FIG. 3, the RAM 24 stores therein the eight video data groups of values shown in FIG. 7. For the selective read-out operation, addresses from which the unit video data are to be read out are designated in dependence on the logical states of the bit outputs QA, QC and QD from the shift register 25 and hence the pattern of charges for ink droplets which precede to and follow, respectively the ink droplet to be recorded, so that the unit video data group is read out as the charge amount data at the output terminals 01 to 08 of the RAM 24. Since the states of the bit outputs QA, QC and QD of the shift register 25 are updated for every pulse of the dot clock pulse signal having the frequency of f/n (of course, there are many cases in which the states of QA, QC and QD remain unchanged even after having been updated), the charge amount data read out at the outputs 01 to 08 from the RAM is also updated for every pulse of the dot clock pulse signal of the frequency f/n.

On the other hand, because distortion of the recorded image is determined by the charge states of the ink droplets preceding to and following, respectively, the ink droplet which contributes to the image recording, the degree of distortion which the ink droplet contributing to the image recording will suffer can be estimated on the basis of the states of the bit outputs QA, QC and QD of the shift register 25 by selecting properly the values of the proportional constants a, c and d which differentiate the values $V_k$ of the unit video data from one another in dependence on the states of the bit outputs QA, QC and QD, as shown in FIG. 7. On the basis of the estimation, the i unit video data which are appropriate for the correction of estimated distortion are selectively read out from the RAM 24 for every column-directing scanning and supplied to the AND gate 7, to thereby reduce effectively distortion of any recorded images.

Since the RAM 24 is so arranged that unit video data for correcting image distortions can be stored therein in the case of the embodiment illustrated in FIG. 3, the contents of the unit video data may vary to different values so as to comply with varieties of distortions for effective correction thereof. Further, alteration of the correcting amount can be effected in an extremely simple manner to another advantage.

It goes without saying that all the plural (say, eight) unit video data groups have to be rewritten, when alteration data are supplied to the CPU 20 from the image size establishing circuit 28 through manipulation of the input switch device 36. In this case, eight types of fresh unit video data groups prepared on the basis of the unit video data values shown in FIG. 7 are written in the RAM. At that time, only the values $v_k$, $v_{k+1}$, $v_{k-1}$ and $v_{k-2}$ are required to be altered, while the constants a, c and d may remain unchanged.

For preparing the charge amount data, a voltage corresponding to a first step level from the lowest level in the column image signal based on a single reference staircase waveform data (refer to FIG. 4A at a) is defined as the gutter level the magnitude of which is so selected that an ink droplet 31 imparted with electric charge corresponding to the gutter level may just reach the recording medium 33 beyond the upper edge of the gutter 34.

In conjunction with FIGS. 6 and 7, it has been described that the charge amount data (i.e. the unit video data) for the k-th ink droplet is determined in consideration of the charge states of the (k+1)-th, (k−1)-th and (k−2)-th ink droplets, In general, it is possible to perform the correction of distortion by utilizing a predetermined number (at least one) of the ink droplets contributing to the recording in precedence to the k-th ink droplet in combination with a predetermined number (at least one) of the ink droplets contributing to the recording subsequently to the k-th ink droplet so as to conform with various performances required for the recording apparatus.

Figure 8:
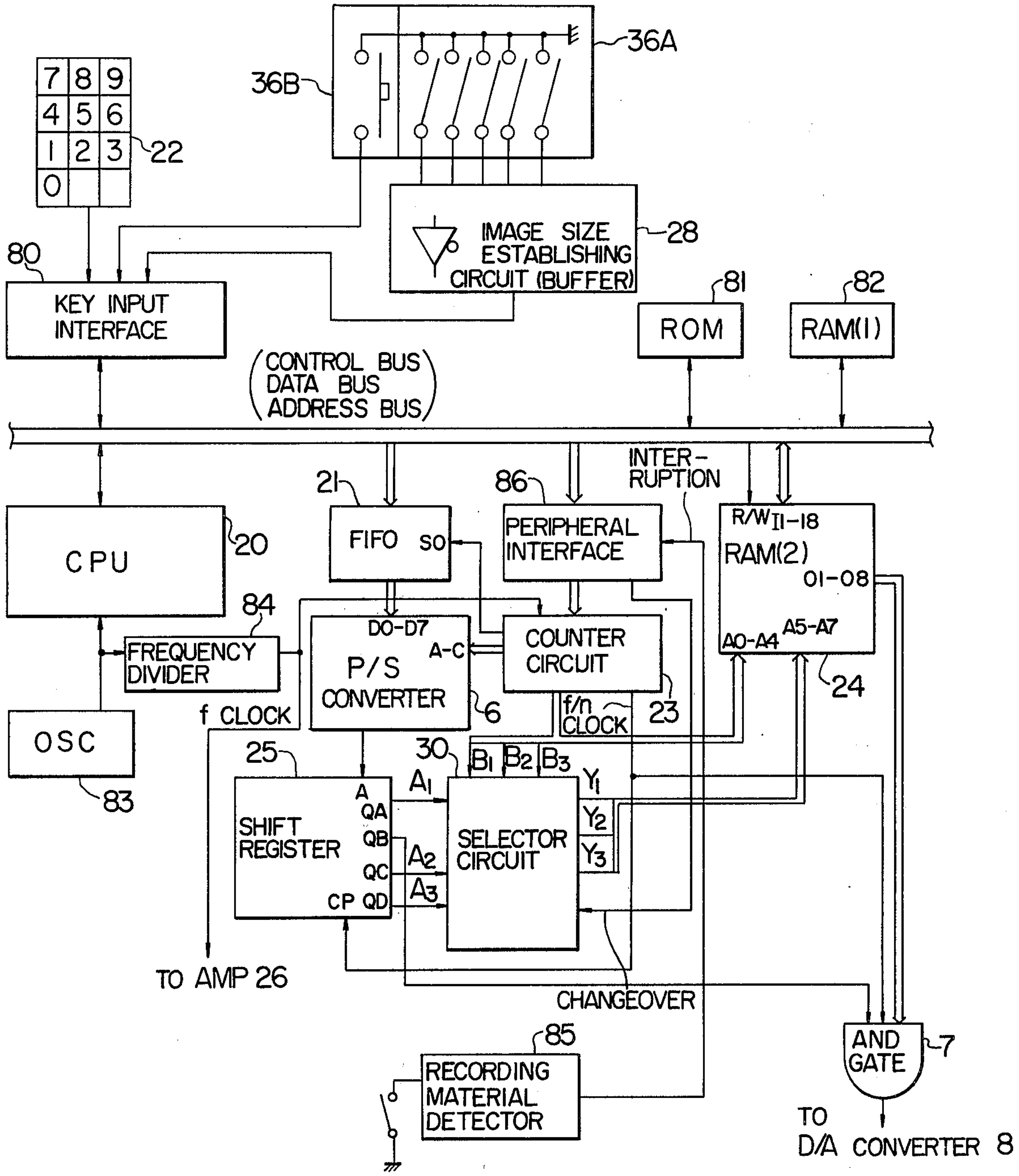
FIG. 8 is a block diagram showing an arrangement of the ink jet recording apparatus according to another embodiment of the invention.

FIG. 8 shows in a block diagram an ink jet recording apparatus according to another embodiment of the invention. The major arrangement of this embodiment is same as the apparatus shown in FIG. 3. FIG. 8 shows in particular the input/output apparatus and the interface device associated with the CPU 20. The recording data input device 22 is composed of a keyboard, and the input switch device 36 includes an image size or height establishing switch 36A and an image height altering switch 36B. The CPU 20 receives data concerning the image to be recorded and the size thereof from the blocks 22, 36 and 28 by way of a key input interface 80. The CPU 20, ROM 81 and RAM (1) 82 are components which constitute a microcomputer. An oscillator 83 and a frequency divider 84 serve to generate a clock signal for driving the CPU and the clock signal of the frequency f described hereinbefore. Reference numeral 85 denotes a detector circuit for sensing or detecting an article to be recorded. When the presence of a recording medium such as a profiled article is sensed by the detector circuit 85, an interrupt operation is activated for reading out the recording contents or data from the ROM 81. The reading operation can be effected by controlling the counter circuit 23 and the selector circuit 30 from the peripheral interface 86.

Main blocks shown in FIG. 8 may be constituted by commercially available microcomputer, IC devices and the like listed below:

| | |
|---|---|
| Character size establishing circuit 28 | 74LS244 (T.I.) |
| Key input interface 80 | 8279 (Intel) |
| CPU 20, ROM 81, RAM(1) 82 | HD 46802 (Hitachi) |
| FIFO register 21 | CD 4015 (RCA) |
| Peripheral interface 86 | HD 46821 (Hitachi) |
| RAM(2) 24 | HM 472114 (Hitachi) |
| P/S converter 6 | HD 74LS151 (Hitachi) |
| Counter circuit 23 | HD 74LS163 (Hitachi) |
| Shift register 25 | HD 74LS164 (Hitachi) |
| Selector circuit 30 | HD 74LS154 (Hitachi) |

Figure 9A:
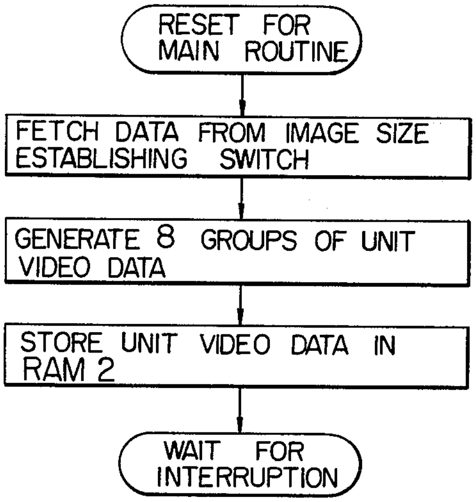
FIGS. 9A to 9E show flow charts to illustrate operational procedures for the ink jet recording apparatus according to an embodiment of the invention.

FIG. 9A shows a flow chart for a main routine for an ink jet recording apparatus according to an embodiment of the present invention. Upon turning on a power switch for the apparatus a reset is effected and the CPU starts operation: data are fetched from the image size establishing circuit; eight (8) groups of unit video data are generated; and the generated unit video data groups are stored in the RAM(2), waiting for an interruption.

Figure 9B:
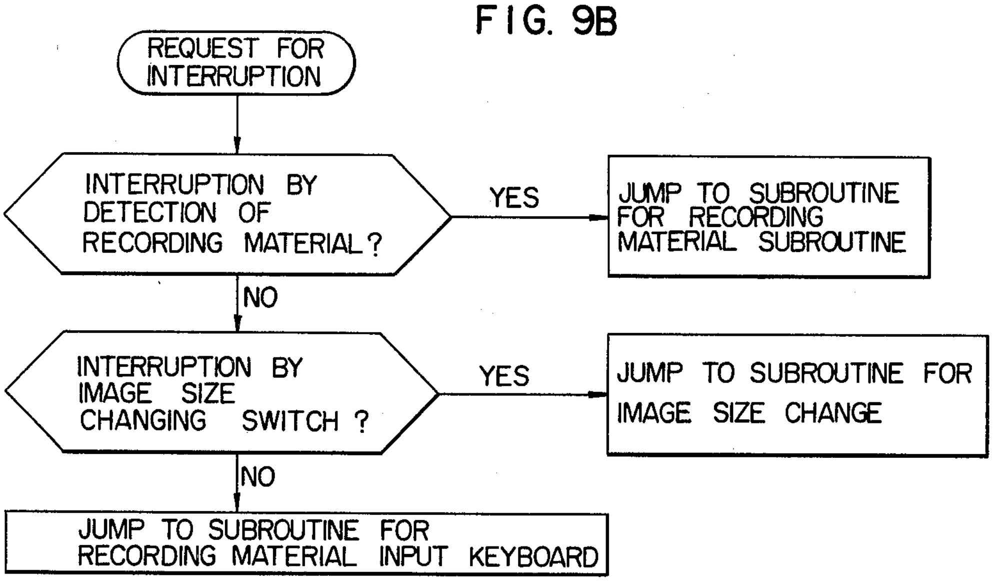

FIG. 9B shows a flow chart for an interruption analysis routine in association with that shown in FIG. 9A. The interruption may be caused by detection of recording material, change of image size or a recording material input keyboard. For the three kinds of interruption a jump is effected to a subroutine corresponding to an interruption cause.

Figure 9C:
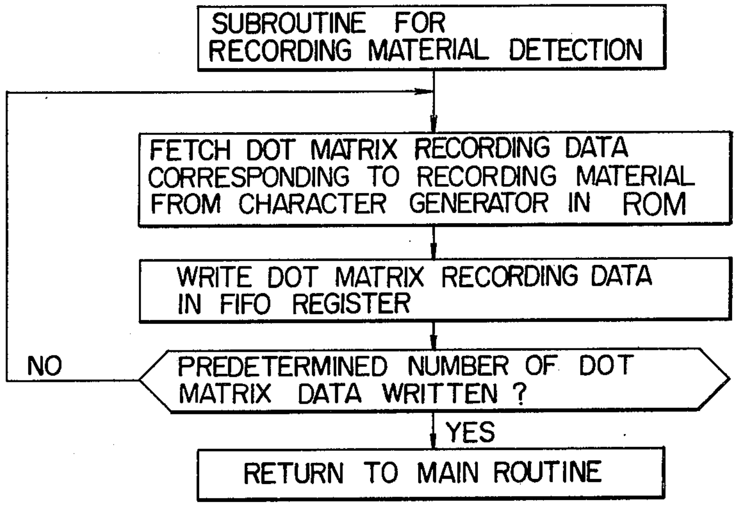
Figure 9D:
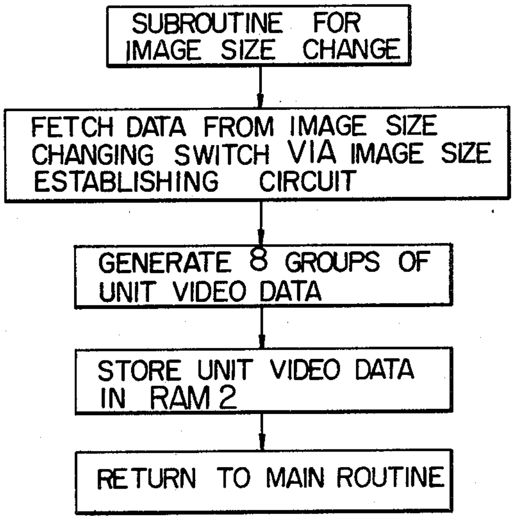
Figure 9E:
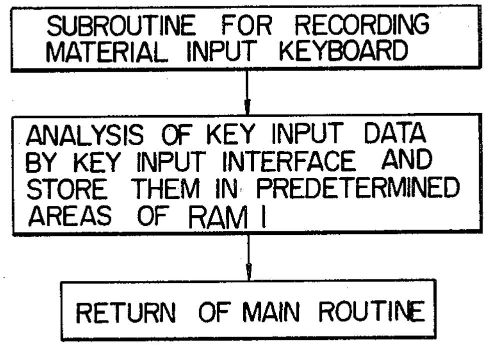

FIGS. 9C–9D show flow charts for subroutines indicated in FIG. 9B and being in association with that shown in FIG. 9A.

As will be appreciated from the foregoing description, the invention has now proposed an ink jet recording apparatus which allows the sizes or heights of characters, symbols or the like to be altered in accordance with the conditions of a surface to be recorded in a facilitated manner and which is capable of correcting distortions possibly produced in the recorded images with a high accuracy. Thus, the ink jet recording apparatus according to the invention which is immune to the shortcomings of the hitherto known apparatus can be effectively and widely employed as printers or the like in many industrial fields.

We claim:

1. An ink jet recording apparatus having a recording head for emitting a train of ink droplets towards a recording surface, in which an image is recorded by scanning the recording surface with the train of ink droplets in two directions, one being a direction of a relative movement between the recording head and the recording surface, the other being a direction substantially perpendicular to the one direction, the apparatus comprising:

means for generating a plurality of groups of unit video data, each of said unit video data groups containing staircase waveform data associated with the scanning in said other direction;

means for storing said plurality of unit video data groups;

means for generating a clock signal having a predetermined repetition frequency;

means for sequentially generating m binary signals (m: positive integer) representative of an image to be recorded, said binary signals being in a timed relation with said clock signal, the scanning operation in said other direction being effected m times for said image to be recorded;

means for sequentially selecting i unit video data (i: integer) among those stored in said storing means to form a series of controlled charge amount data for each scanning operation in said other direction on said recording surface, the values of said sequentially selected unit video data being stepwise monotonously changed;

means for creating a logical product of said clock signal, said selected unit video data and said binary signal; and means for generating an image signal from the output of said logical product creating means for giving charges to said train of ink droplets.

2. An ink jet recording apparatus having a recording head for emitting a train of ink droplets towards a recording surface, in which an image is recorded by scanning the recording surface with the train of ink droplets in two directions, one being a direction of a relative movement between the recording head and the recording surface, the other being a direction substantially perpendicular to the one direction, the apparatus comprising: means for generating a plurality of unit video data associated with the scanning in said other direction;

means for storing said plurality of unit video data;

means for generating a clock signal having a predetermined repetition frequency;

means for sequentially generating m binary signals (m: positive integer) representative of an image to be recorded, said binary signals being in a timed relation with said clock signal, the scanning operation in said other direction being effected m times for said image to be recorded;

means for sequentially selecting i unit video data (i: integer) among those stored in said storing means to form a series of charge amount data for each scanning operation in said other direction on said recording surface, the values of said sequentially selected unit video data being stepwise monotonously changed;

means for creating a logical product of said clock signal, said selected unit video data and said binary signal;

means for generating an image signal from the output of said logical product creating means for giving charges to said train of ink droplets, and means connected with said unit video data generating means for establishing the size of the image to be recorded, said establishing means including means for changing the difference between the values of adjacent charge amount data in said series of charge amount data.

3. An apparatus according to claim 1 or 2, further comprising means for sensing the binary states of a predetermined number of successive bits in each of said m binary signals to generate a correcting instruction signal and supplying the correcting instruction signal to said selecting means for use in determining which one of the unit video data stored in the storing means be selected, said predetermined number of successive bits in each binary signal including a next lower order bit and a next higher order bit with respect to a bit associated with an ink droplet which is to receive electric charge determined by said selected unit video data.

4. An apparatus according to claim 2, in which a central processing unit is provided to serve as said unit video data generating means and as said binary signal generating means, said sensing and supplying means is a shift register, the apparatus further comprises a first-in first-out register for receiving said m binary signals in a parallel form one by one and a converter for converting the parallel binary signals to serial binary signals, said serial binary signals being supplied to said shift register, said shift register having one bit terminal connected with said logical product creating means, at least next lower order and next higher order bit terminals connected with said selecting means.

5. An ink jet recording apparatus of a dot matrix type having a recording head, in which an image is recorded by row-direction and column-direction scanning on a recording surface, the row-direction scanning being effected by relative movement between the recording head and the recording surface while the column-direction scanning being effected by difference in amount of charge given to ink droplets emitted from the recording head, the apparatus comprising:

a central processing unit capable of generating a plurality of groups of unit video data and m binary dot data for an image to be recorder (m: integer), each of said unit video data groups including i unit video data (i: integer) associated with said column-direction scanning and having such different values that the i unit video data may constitute in combination a series of charge amount data containing staircase waveform information, i being identical with the number of column dots for the image to be recorded;

a random access memory for storing said pluraity of groups of unit video data;

means for sequentially selecting i unit video data among said plurality of groups of unit video data stored in said ramdom access memory for each column of dots for the image to be recorded so that said column-direction scanning is subjected to substantially no distortion due to electrostatic interference between ink droplets;

means for creating a logical product of said binary dot data and said selected unit video data for each column for said image; and means for converting the output of said logical product creating means to an image signal for giving charges to the ink droplets.

6. An ink jet recording apparatus of a dot matrix type having a recording head, in which an image is recorded by row-direction and column-direction scanning on a recording surface, the row-direction scanning being effected by relative movement between the recording head and the recording surface while the column-direction scanning being effected by difference in amount of charge given to ink droplets emitted from the recording head, the apparatus comprising:

a central processing unit capable of generating a plurality of groups of unit video data and m binary dot data for an image to be recorded (m: integer), each of said unit video data groups including i unit video data (i: integer) associated with said column-direction scanning and having such different values that the i unit video data may constitute in combination a series of charge amount data containing staircase waveform information, i being identical with the number of column dots for the image to be recorded;

a random access memory for storing said plurality of groups of unit video data;

means for sequentially selecting i unit video data among said plurality of groups of unit video data stored in said random access memory for each column of dots for the image to be recorded;

means for creating a logical product of said binary dot data and said selected unit video data for each column for said image;

means for converting the output of said logical product creating means to an image signal for giving charges to the ink droplets, and means connected with said central processing unit for establishing the size of the image to be recorded, said image size establishing means including means for changing the step difference between the values of adjacent charge amount data in each charge amount data series containing staircase waveform information.

7. An apparatus according to claim 5 or 6, further comprising means for sensing the states of some of said binary dot data to generate a correcting instruction signal and supplying the instruction signal to said selecting means for contribution to determination of which ones of unit video data stored in said random access memory be selected.

* * * * *